UNITED STATES PATENT OFFICE.

HENRY VONPHUL DRAPER, OF SPRINGFIELD, MISSOURI, ASSIGNOR OF ONE-HALF TO GEORGE A. HANCOCK, OF SPRINGFIELD, MISSOURI.

PROCESS OF HARDENING COPPER.

No. 896,632.  Specification of Letters Patent.  Patented Aug. 18, 1908.

Application filed June 10, 1905. Serial No. 264,729.

*To all whom it may concern:*

Be it known that I, HENRY VONPHUL DRAPER, a citizen of the United States, residing at Springfield, in the county of Greene and State of Missouri, have invented new and useful Improvements in Processes of Hardening Copper, of which the following is a specification.

The invention relates to a process for hardening metals, particularly to copper.

In carrying out the process I employ the following ingredients, pulverized alum and arsenic.

The method of employing the process is as follows: The copper is first melted in a suitable retort or furnace, and the ingredients named above are added thereto. I have found in practice that the following proportions will yield the best results, though I do not wish to limit myself exactly thereto. For twenty pounds of copper I use one pound of pulverized alum and four ounces of arsenic. I have also found that better results are obtained by mixing the pulverized alum and arsenic thoroughly together before introducing them into the retort.

The melted copper is slightly chilled on the addition of the ingredients noted, but a thorough commingling is attained by subjecting the material to the further action of the heat until the visual presence of the ingredients has been removed and the mass presents a uniform appearance. After this combining the mass is subjected to a thorough agitation or stirring, and is then ready to be poured into the molds. The resultant metal is of great density, toughness and hardness, and is particularly serviceable for use in those situations requiring a metal of this nature. Another decided advantage resulting from my process is that the metal may be re-melted as often as desired without losing the characteristics imparted to it as the essential result of the process.

Having thus described the invention, what I claim as new, is:—

1. The process of hardening copper which consists in mixing with the molten metal alum and arsenic, subjecting the mixture to the further action of heat and thoroughly agitating the mixture before cooling.

2. The herein described process of hardening copper consisting in thoroughly mixing pulverized alum and arsenic, and adding the mixture to copper while in a molten state.

In testimony whereof, I affix my signature in presence of two witnesses.

HENRY VONPHUL DRAPER.

Witnesses:
R. E. WATSON,
H. P. JOHN.